Patented Apr. 7, 1925.

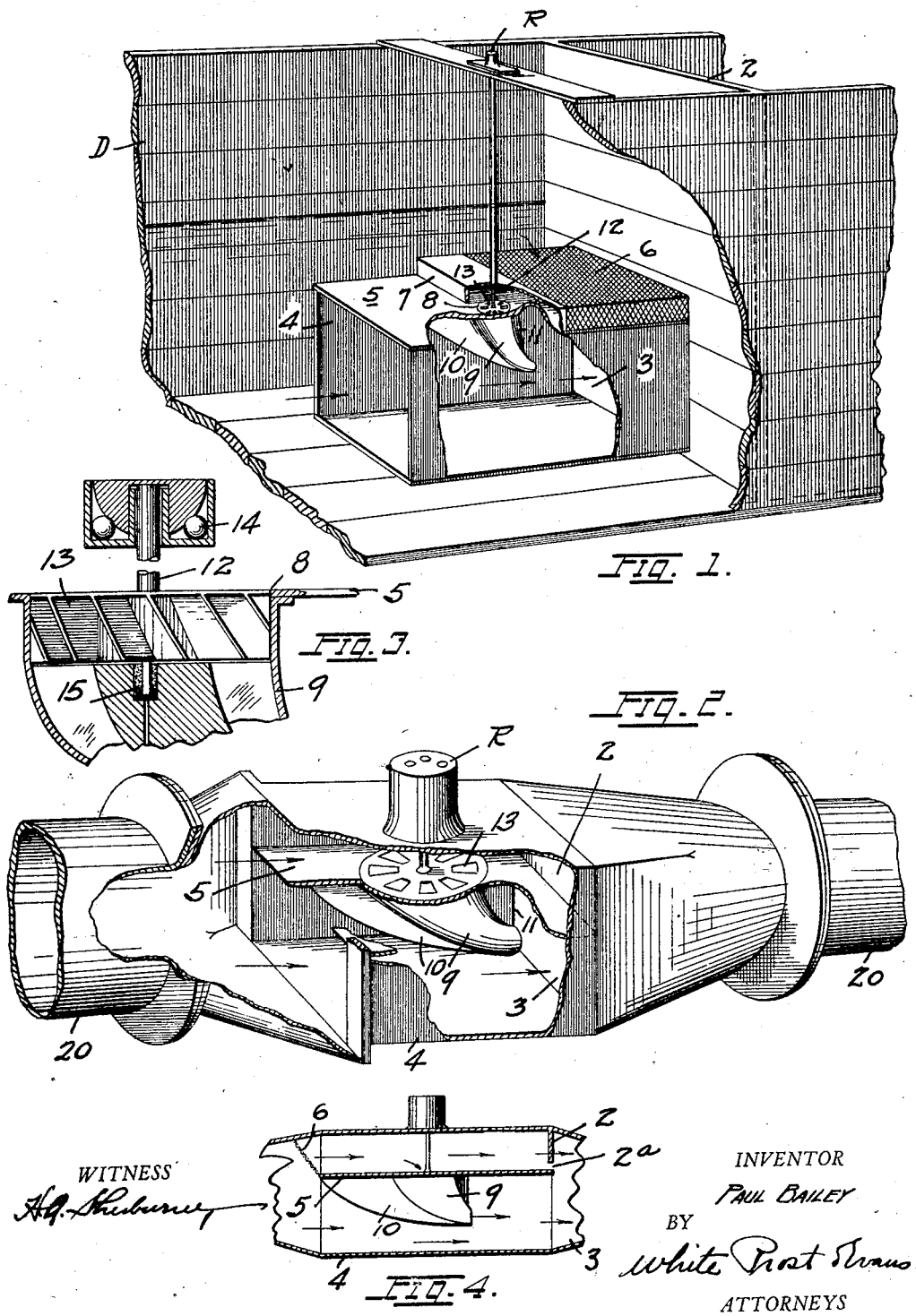

1,532,295

UNITED STATES PATENT OFFICE.

PAUL BAILEY, OF BERKELEY, CALIFORNIA.

LIQUID METER.

Application filed March 24, 1921. Serial No. 455,091.

*To all whom it may concern:*

Be it known that I, PAUL BAILEY, a citizen of the United States, and a resident of the city of Berkeley, county of Alameda, State of California, have invented a new and useful Liquid Meter, of which the following is a specification.

The present invention has reference to a form of meter in which difference in static pressure is depended upon to indicate the volume of flow.

It is an object of the invention to provide a meter which indicates the velocity of flow by measuring, dynamically, the difference in static pressure as between still water, or practically still water, and flowing water all in a common conduit.

A further object is to provide a measuring apparatus by which there may be effected, in a common conduit, a difference in static pressure is a flowing body of water, or other liquid, and to utilize this difference in the dynamic operation of an indicating device.

Another object of the invention is to provide a static meter of great efficiency, and accuracy and simplicity, and low in cost and reliable in action.

A further object is to provide a new method for measuring flowing liquids.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Fig. 1 is a perspective of a portion of an open type flume or conduit with the meter applied.

Fig. 2 is a perspective of a portion of a closed type of conduit with the meter applied.

Fig. 3 is a detail sectional view of a form of wheel and its mounting.

Fig. 4 is a sectional view showing a slightly modified form of static chamber.

The present invention differs in its scientific principle of operation from all other meters in that it establishes in a common conduit a difference in static pressure and which difference is utilized as a means for measuring flow through the conduit.

The apparatus involves a short tube of suitable and predetermined dimensions in which is disposed a transverse wall with, or forming, a discharge orifice and in this tube is also disposed a horizontal partition in advance of the discharge orifice, with respect to the line of flow, and abutting the wall. This forms upper and lower pockets through the lower of which the water freely flows while in the upper it is practically still because blocked against free flow by the wall. This structure will, therefore, create in the upper pocket a greater static pressure than in the lower pocket because of the difference in the kinetic energy in the water in the two pockets and because of frictional and other losses of energy by the flowing water. This difference in static pressure between the two pockets will vary with the velocity of flow of liquid through the tube of fixed dimensions and constitutes a dependable index of the velocity of flow and also the rate of flow through the tube.

Combined with the tube is a means for dynamically utilizing the difference in static pressure in the pockets.

The generic principle involved may be applied to conduits of various sizes and shape and obviously the proportions and dimensions of the necessary structure will be calculated to give proper results in given cases.

The system is adaptable in organizations appropriate for the measurement of flow in open and in closed conduits respectively.

Commercial forms of apparatus are shown in the drawings and described more in detail hereinafter.

An open conduit D is provided with a transverse head 2 and this is provided with an orifice 3 about which is placed a short tube 4. The tube projects upstream from the head 2 and water flows into and freely through the tube and to the orifice 3. The tube 4 has its top 5 below the normal surface of water on the upside of the head and therefore water without velocity, other than eddies, lies above the top 5. On this top is a screen 6 at the front of which is an imperforate barrier 7 behind which is an opening 8 in the top 5, and this opening provides for a small flow of water from the dead body above into the flowing stream in the tube 4. This flow through the opening 8 is due to the difference in the static pressure above and below the top 5 of the tube.

The static difference is increased and increment of kinetic energy is obtained by leading the water in the opening 8 into a contracted pipe 9 curved down-stream. This pipe is shown as provided upon the lower face of the top 5 of the tube, and it may be embodied in the form of a casting having stream-line fins 10 and 11.

In the intake opening 8 of the pipe 9 is a vertical shaft 12 having a down-flow turbine wheel 13 of any desired type. The shaft and its wheel is suspended on a ball or other bearing 14 and the lower end of the shaft is suitably guided in a bearing 15.

The water wheel shaft 12 is connected to a suitable type of register indicated at R at which is readily observable the record showing the quantity of water that has passed through the tube since a given setting of the meter, and velocity and rate of flow.

The same principal elements of the above described apparatus are incorporated in a meter for use in a closed conduit, as the pipe 20, Fig. 2.

The screen may be omitted as in Fig. 2 or it may be arranged at the intake end of the pocket above the partition 5, as in Fig. 4.

It may be desirable to permit a slow flow of water through the upper pocket in the tube 4 to remove sediment and this is accomplished by providing an outlet 2ª in the wall 2, Fig. 4.

It is understood that the quiet zone of water is not necessarily at the top of the tube, and also that the tube may consist of a part of the conduit, as in Fig. 2.

The still water may be agitated by eddies and has a slight flow into the tube but it is relatively still as to water flowing through the tube.

The meter mechanism may be of any desired type and may register either the velocity of flow, rate of flow or total flow, or all or any of these factors.

What is claimed is:

1. An apparatus for measuring flow of liquid in a conduit, comprising a short tube in the conduit and through which all of the liquid to be measured passes, means for forming adjacent to the tube a relatively still body of liquid, means providing for flow of liquid from the still body into the tube, means for measuring flow through the tube and operated by the dynamic force of the flow from the still body to the moving body in the tube, and means for increasing the force of said operating flow by suction effect derived from the movement of the large body of liquid passing through the tube.

2. An apparatus for measuring the flow of liquid comprising a conduit having a transverse wall provided with a submerged orifice, a tube surrounding said orifice and extending upstream therefrom, a partially foraminated wall enclosing a chamber on one side of said tube, the unforaminated portion of said wall lying upstream, a conductor connecting said chamber within the unforaminated portion with the interior of said tube and extending downstream therein, a register, and means operated by the flow of water thru said conductor for operating said register.

3. An apparatus for measuring the flow of liquid comprising a conduit having a transverse wall provided with a submerged orifice, a tube surrounding said orifice and extending upstream therefrom, a stream lined conductor having a constricted outlet and extending thru one side of said tube and downstream therein, a wall upstream from and overlying the intake end of said conductor, a register, and means operated by the flow of water thru said conductor for operating said register.

In testimony whereof, I have hereunto set my hand.

PAUL BAILEY.